United States Patent
Casey et al.

(10) Patent No.: US 9,948,098 B1
(45) Date of Patent: Apr. 17, 2018

(54) FAULT TOLERANCE CONTROL STRATEGIES FOR MULTI-KITE POWER GENERATION SYSTEM

(71) Applicant: X Development LLC, Mountain View, CA (US)

(72) Inventors: Leo Francis Casey, Mountain View, CA (US); Geoff Dolan, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 288 days.

(21) Appl. No.: 14/986,251

(22) Filed: Dec. 31, 2015

(51) Int. Cl.
  *A63H 27/04* (2006.01)
  *H02J 3/00* (2006.01)
  *H02M 7/68* (2006.01)

(52) U.S. Cl.
  CPC .............. *H02J 3/00* (2013.01); *H02M 7/68* (2013.01); *B64D 2221/00* (2013.01)

(58) Field of Classification Search
  CPC combination set(s) only.
  See application file for complete search history.

(56) References Cited

U.S. PATENT DOCUMENTS

| | | | |
|---|---|---|---|
| 7,317,261 B2 * | 1/2008 | Rolt | B64C 39/022 244/24 |
| 7,629,708 B1 | 12/2009 | Meyers et al. | |
| 8,148,838 B2 | 4/2012 | Ferguson | |
| 8,444,081 B2 | 5/2013 | Grenier | |
| 9,567,979 B2 * | 2/2017 | Goessling | F03D 7/026 |
| 9,611,835 B1 * | 4/2017 | Vander Lind | F03D 7/028 |
| 2010/0283253 A1 | 11/2010 | Joeben | |
| 2013/0233964 A1 | 9/2013 | Woodworth et al. | |

FOREIGN PATENT DOCUMENTS

WO 2015155203 A1 10/2015

* cited by examiner

*Primary Examiner* — An Luu
(74) *Attorney, Agent, or Firm* — McDonnell Boehnen Hulbert & Berghoff LLP

(57) ABSTRACT

A power distribution system includes at least a ground power unit, an aerial vehicle, and a power station. The ground power unit is configured to convert an input AC power into DC power output, wherein the ground power unit includes at least a first bus, second bus, and a third bus, wherein the first bus is configured to operate at a first voltage level referenced to the third bus, and wherein the second bus is configured to operate at a second voltage level referenced to the third bus that is different from the first voltage level. The aerial vehicle may include a plurality of motor-generators coupled to a respective plurality of turbines, wherein the plurality of motor-generators may be configured to be energized by power received from a tether. The power station may be electrically coupled to at least the first bus, the second bus, and the tether and configured to: (i) selectively energize the tether using the first bus; and (ii) responsive to detecting a fault by at least one motor-generator of the plurality of motor-generators, selectively energize the tether using the second bus and not the first bus.

20 Claims, 11 Drawing Sheets

FAULT TOLERANCE CONTROL STRATEGIES FOR MULTI-KITE POWER GENERATION SYSTEM

BACKGROUND

Unless otherwise indicated herein, the materials described in this section are not prior art to the claims in this application and are not admitted to be prior art by inclusion in this section.

Power generation systems may convert chemical and/or mechanical energy (e.g., kinetic energy) to electrical energy for various applications, such as utility systems. As one example, a wind energy system may convert kinetic wind energy to electrical energy. Wind energy systems may use turbines that have a rotor coupled to a generator. Incident wind turns the rotor, which rotates a shaft, and the generator can then use the motion of the shaft to generate electricity.

Electrical power transmission and distribution systems distribute electrical energy using networks of conductive lines. Generally, electrical energy is conveyed from energy generation stations to energy consumers.

SUMMARY

Methods and systems for handling faults in bidirectional power conversion systems are described herein. Embodiments described herein may involve powering motor-generators with varying voltage levels to avoid overvoltage and/or undervoltage, including under fault conditions.

In one aspect, a power distribution system is disclosed. A power distribution system includes at least a ground power unit, an aerial vehicle, and a power station. The ground power unit is configured to convert an input AC power into DC power output, wherein the ground power unit includes at least a first bus, second bus, and a third bus, wherein the first bus is configured to operate at a first voltage level referenced to the third bus, and wherein the second bus is configured to operate at a second voltage level referenced to the third bus that is different from the first voltage level. The aerial vehicle may include a plurality of motor-generators coupled to a respective plurality of turbines, wherein the plurality of motor-generators may be configured to be energized by power received from a tether. The power station may be electrically coupled to at least the first bus, the second bus, and the tether and configured to: (i) selectively energize the tether using the first bus; and (ii) responsive to detecting a fault by at least one motor-generator of the plurality of motor-generators, selectively energize the tether using the second bus and not the first bus.

In another aspect, a power distribution system is disclosed. The power distribution system may include a ground power unit, an aerial vehicle, and a power station. The ground power unit may be configured to convert an input AC power into DC power output. The ground power unit may include a first bus configured to operate at a first voltage level to a reference bus. The aerial vehicle may include a plurality of motor-generators coupled to a respective plurality of turbines. The plurality of motor-generators may be configured to be energized by power received from a tether. The power station may be electrically coupled to the first bus and the tether. The power station may include a power converter that receives power from the first bus and may be configured to output a second voltage level to a reference bus via a second bus. The power station may be configured to selectively energize the tether using either the first bus or the second bus responsive to detecting a fault by at least one motor-generator of the plurality of motor-generators.

In still another aspect, a method is disclosed. The method involves providing at least a first power bus configured to operate at a first DC reference voltage level by converting AC power from an AC source into DC power. The method also involves providing a second power bus configured to operate at a second DC reference voltage level that is different from the first DC reference voltage level. The method further involves energizing a plurality of motor-generators from the first power bus. Additionally, the method involves determining an operational condition of the plurality of motor-generators. Further, the method involves energizing the plurality of motor-generators from the second power bus based on the determined operational condition being indicative of a fault.

In yet another aspect, a system is disclosed. The system includes a means for providing a first power bus configured to operate at a first DC reference voltage level by converting AC power from an AC source into DC power. The system also includes a means for providing a second power bus configured to operate at a second DC reference voltage level that is different from the first DC voltage level. The system further includes a means for energizing a plurality of motor-generators from the first power bus. Additionally, the system includes a means for determining an operational condition of the plurality of motor-generators. Further, the system includes a means for energizing the plurality of motor-generators from the second power bus based on the determined operational condition being indicative of a fault.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

DETAILED DESCRIPTION

Figure 1:
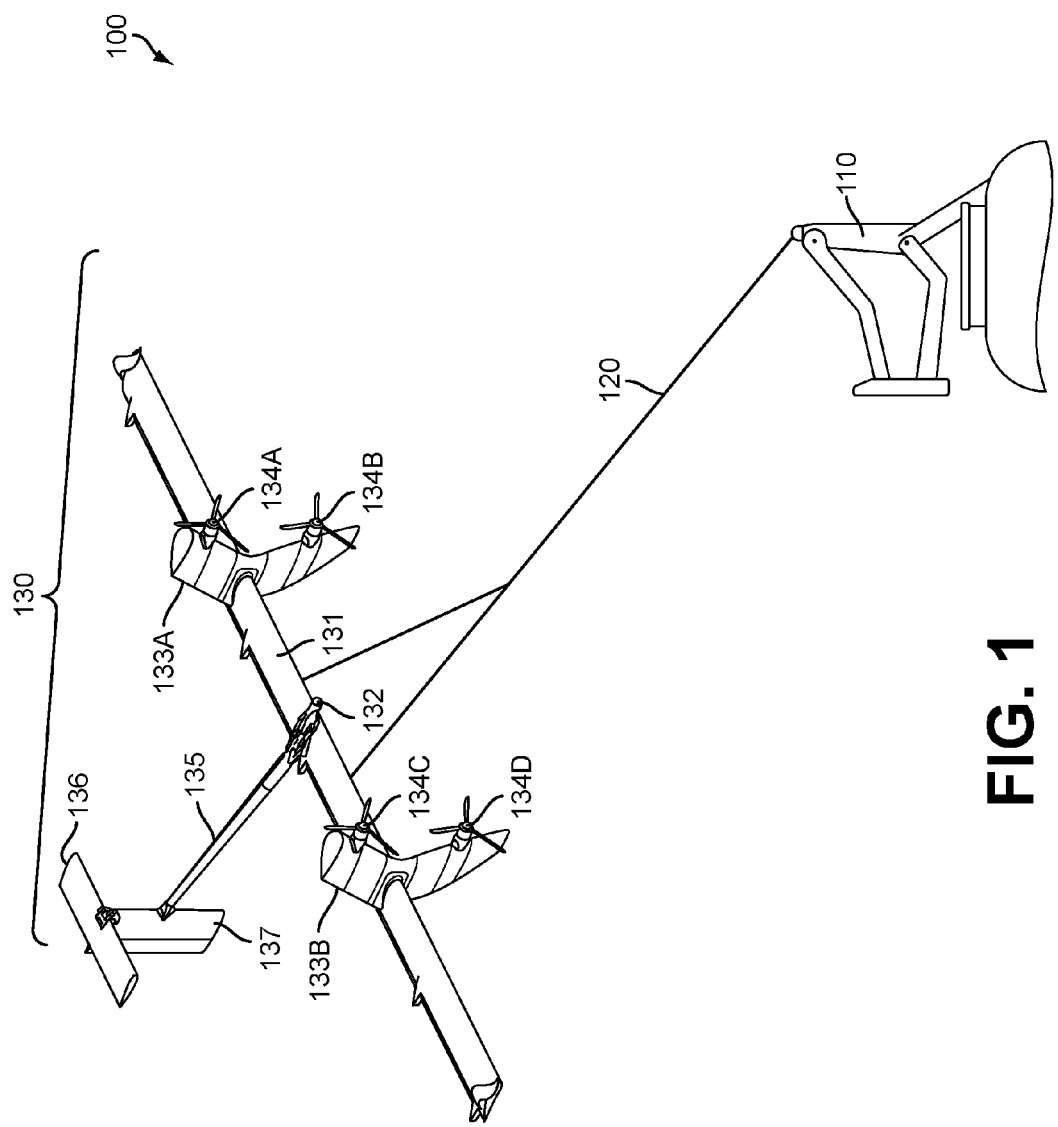
FIG. 1 depicts an Airborne Wind Turbine (AWT), according to an example embodiment.

The following detailed description describes various features and functions of the disclosed systems and methods with reference to the accompanying figures. The illustrative system and method embodiments described herein are not meant to be limiting. It may be readily understood that certain aspects of the disclosed systems and methods can be arranged and combined in a wide variety of different configurations, all of which are contemplated herein.

I. OVERVIEW

Illustrative embodiments relate to fault mitigation in multi-turbine wind-based power generation systems. In particular, illustrative embodiments may relate to or take the form of circuits, batteries, controllers, and/or some combination thereof that may be used to provide a variable-capacity power conversion system.

An example bidirectional power distribution system may include an AC power grid, a bidirectional power converter stack, and a group of motor-generators, among other possible components. In one operational mode—which may be referred to herein as the "motoring" mode—the bidirectional power converter stack may receive AC power from the AC grid, and may convert that AC power into DC power. The generated DC power may energize the motor-generators, causing them to act as motors (which may, for example, cause rotors to rotate and spin up turbines or propellers).

In another operational mode—which may be referred to herein as the "generating" mode—turbines coupled to rotors of the motor-generators may interact with incident wind that causes the turbines to rotate, causing the motor-generators to act as generators. The motor-generators may, with or without additional circuitry, generate DC power. The bidirectional power converter stack may receive the DC power generated by the motor-generators, and may convert that DC power into AC power supplied to the AC power grid.

A bidirectional power converter stack may include a plurality of bidirectional power converters whose DC terminals are electrically connected to each other in series. Each bidirectional power converter may convert AC power into DC power of a particular DC voltage level. By connecting the DC terminals of the bidirectional power converters to each other in series, the DC voltages provided by each bidirectional power converter may be added such that the ends of stack (that is, the outer-most terminals in the series connection) form a total DC voltage representing the sum of the DC voltages provided by each bidirectional power converter. In this manner, a large DC voltage may be produced for driving high-voltage motor-generators, or alternatively high-voltage stacks of motor-generators.

In some instances, the bidirectional power distribution system may form a part of a wind energy system, where the motor-generators are incorporated within an aerial vehicle such as an Airborne Wind Turbine (AWT). An AWT may include an aerial vehicle that flies in a closed path, such as a substantially circular path, to convert kinetic wind energy to electrical energy. In an illustrative implementation, the aerial vehicle may be connected to a ground station via a tether. While tethered, the aerial vehicle can: (i) fly at a range of elevations and substantially along the path, and return to the ground, and (ii) transmit electrical energy to the ground station via the tether.

In the context of the operational modes described above, a "motoring" AWT may perform a powered ascent ("takeoff") to place the AWT at an elevation, and/or may perform a powered descent ("landing") to place the aerial vehicle on the ground or coupled to a base station. A "generating" AWT may fly in a path to convert kinetic wind energy into electrical energy. One set of operations may involve the AWT taking off until it reaches a sufficient altitude, at which point the AWT begins generating electricity; at the close of the generating mode, the AWT may perform the powered descent to land the AWT safely on the ground or onto a base station.

Various fault scenarios—when unaccounted for—may present possibilities for the AWT to be damaged. If a fault occurs during the takeoff or landing of an AWT, the AWT may become underpowered, potentially rendering the AWT unable to land safely (e.g., at a safe landing speed). If a fault occurs while the AWTs are generating power, the amount of AC power generated by the wind generation system may drop below an acceptable level (e.g., below operational demands of components connected to the AC power system, below output requirements set forth by regulatory authorities, and/or a sufficiently large drop in DC voltage that affects the performance of the bidirectional power converter stack).

In one example, a motor-generator coupled to an AWT may experience a fault or failure that impairs the motor-generator's ability to drive a turbine and/or to generate power. Such a fault may include mechanical failures (e.g., a damaged stator or rotor), electrical failures (e.g., a short or open that impairs the motor-generator), and/or other possible problems that impact the performance of the motor-generator. In some instances, such a fault or failure, when unaccounted for, may lead to additional failures of other components. For example, if the faulted motor-generator is electrically coupled to other motor-generators in series, the failure of one motor-generator might cause the voltage driving the motor-generators to be distributed over fewer motor-generators; as a result, each of the remaining motor-generators may be overvoltaged (that is, being driven by a higher voltage level than the motor-generator can sustain for a long duration). Thus, a failure of one motor-generator might potentially lead to a cascade of additional failures.

In the reverse direction, a faulted motor-generator's ability to generate power might be substantially impaired. As a result, the power and/or voltage output by the motor-generator might be diminished. This reduction of generated power and/or voltage might impact devices that utilize the generated power, such as inverters or bidirectional power converters. When undervolted, an inverter and/or bidirectional power converter may not be able to operate properly (that is, be unable convert the DC power into AC power, or at least unable to generate AC power of a particular RMS voltage level).

To mitigate these faults, a power generation system might be configured to drive the motor-generators using a voltage level that matches or approximately matches the operational voltage of the motor-generator configuration. For example, if four motor-generators each operate at 100 V, the series connection of the four motor-generators have an operational voltage of 400 V. However, if one of those motor-generators experiences a failure, the remaining three motor-generators have an operational voltage of 300 V. In this example, the power generation system might be configured to reduce the voltage that drives the motor-generators from 400 V to 300 V responsive to detecting the fault. By reducing the voltage, the remaining operational motor-generators are not overvoltaged, and therefore do not undergo voltage stresses that could otherwise cause them to also fail.

Power generation systems described herein may dynamically (i.e., in real time or near-real time) vary the voltage applied to the motor-generators to avoid overvolting and/or undervolting the motor-generators. In some embodiments, a power generation system may include two voltage lines—a "nominal" voltage line and a "fault" voltage line—that share a common ground or a common reference node (which may be either a positive voltage or a negative voltage with respect to ground). With respect to ground, the nominal voltage line may be used to drive the motor-generators during normal operation; however, upon the occurrence of a fault, the fault voltage line (which may, for example have a lower voltage level than the nominal voltage line) may drive the motor-generators. In various implementations, a power generation system may include many voltage lines to account for a variety of fault scenarios (which may be higher or lower voltage than the "nominal" voltage line).

In other embodiments, different voltage levels may be provided for using a voltage converter. For example, a power generation system may include power electronics (e.g., transformer, autotransformer, etc.), DC-DC converters (e.g., boost converters, buck converters, buck-boost converters, etc.), or some combination thereof that facilitate the voltage conversion from a nominal voltage level to another voltage level (either a reduced or increased voltage level compared to the nominal voltage level). The voltage converter may output a predetermined voltage level, or may be tunable to output a particular voltage level. For example, a voltage converter may include circuitry, hardware, and/or software that interfaces with a controller or computing device and is capable of receiving instructions that tune the voltage conversion. A controller may monitor each motor-generator to determine the number of motor-generators that are operational, and accordingly instruct the voltage converter to deliver a voltage based on that number. For instance, if the controller determines that three 100 V motor-generators are operational, the controller might cause the voltage converter to output at or near 300 V. The controller may be a microcontroller, microprocessor, electrical circuit, an application-specific integrated circuit (ASIC), or a computing device, among other possible controllers.

In additional embodiments, bidirectional power converters in the stack might employ power electronics and/or voltage converters that enable each bidirectional power converter to vary the DC voltage that it outputs and/or the DC voltage that it is configured to receive. For example, a bidirectional power converter might include transformers or an autotransformer at the AC side. As another example, a bidirectional power converter might include buck or boost converters. Regardless of the implementation, each bidirectional power converter may be configured to provide at least two different voltage operational modes.

As a specific example, a bidirectional power converter stack might include four series-connected bidirectional power converters, each capable of outputting DC voltages of 100 V and 75 V. During normal operation, a set of four 100 V motor-generators might be driven by 400 V, provided by the bidirectional power converter stack with each bidirectional power converter outputting 100 V. However, if one of the motor-generators fails, each of the four bidirectional power converters in the stack might begin outputting at the reduced 75 V level to collectively form a 300 V bus. This 300 V bus may approximately match the operational voltage of the three remaining 100 V motor-generators.

When generating, the power generation system might also modify the operational voltage of the bidirectional power converters in the stack when the voltage provided by the motor-generators is different from an expected voltage level. Referring back to the example above, failure of one motor-generator would cause the output of the motor-generators (when generating power) to be at 300 V. This 300 V might be of an insufficient voltage to drive the full bidirectional power converter stack, if the four bidirectional power converters are each configured to operate at 100 V. However, if the bidirectional power converters are capable of DC-side voltage conversion, then a voltage converter (such as a boost converter) might enable each bidirectional power converter to operate at a reduced voltage (in this example, 75 V). Within each bidirectional power converter, the 75 V DC input power might be up-converted into 100 V DC, which may be of a sufficient level to generate a particular AC voltage.

In some instances, a system with multiple AWTs may include a single shared bidirectional power converter stack that facilitates the conversion between AC power and DC power. Each AWT may be coupled to a respective base station, which is could be electrically coupled to the shared converter stack. In such a multi-AWT configuration, the shared converter stack may provide multiple voltage buses to the base stations. If a particular AWT experiences a motor-generator failure, it's respective base station may selectively drive the AWT (via a tether) using a reduced voltage bus provided by the shared converter stack. In another configuration, the power converter stack might provide a single voltage bus, and each base station might include power conversion electronics to generate additional voltage levels that can selectively energize the AWT during fault scenarios.

The above-described motor-generator fault-mitigation techniques include providing multiple voltage busses and power conversion electronics at various stages in the power generation system. It should be understood that any combination of these may be employed, depending on the particular implementation.

In various implementations, dynamic power control techniques (which may include fault mitigation, compliance with grid operations, etc.) may be designed to comply with regulations set forth by regulatory agencies, agreements between power suppliers and power consumers, and/or other design goals (e.g., related to system uptime, limits on the rate of change on the power supplied by a system, etc.). As renewable energy sources become increasingly incorporated within large-scale power systems, certain requirements may be set forth to maintain the integrity and continuous operation of those large-scale power systems. Unlike other typical energy sources, some renewable resources, such as wind, are non-constant. Various dynamic power control techniques described herein may be implemented to account for such fluctuations in power output in spite of the non-constant nature of wind, thereby enabling a bidirectional power conversion to operate in accordance with various operational requirements.

As described herein, a "bidirectional power converter" may include circuit components to facilitate conversion between AC power and DC power. In some instances, a bidirectional power converter may include transformers, isolation barriers, switching bridges, filters, switching protection, sensors, buck converters, boost converters, sensors, other power supply elements, and/or any combination thereof. During AC-to-DC conversion, a bidirectional power converter may rectify and filter an AC signal. During DC-to- AC conversion, a bidirectional power converter may invert a DC signal into an AC signal of some frequency (e.g., 50 or 60 Hz) having any number of phases (e.g., two phases or three phases). Various bidirectional power converters may include control inputs that enable aspects of the converter's operation to be adjusted, such as output voltage levels (either on the AC side or DC side).

As described herein, a "motor-generator" may be any electromechanical device capable of converting between electrical energy and kinetic energy. A motor-generator may include a stator, a rotor, inductive windings, magnets, electronic components (such as drivers), and/or any combination thereof. Note that a motor-generator may any kind of motor or generator, including induction based motor-generators, permanent magnet based motor-generators, brushed DC motors-generators, brushless DC motor-generators, or any other kind of motor or generator. A motor-generator may be operable to rotate a rotor through magnetic induction or electromagnetic force in response to receiving electrical power. A motor-generator may also be operable to generate electrical power in response to being rotated by another device (e.g. a turbine coupled to the rotor). Additionally, a "motor-generator" may refer to a device that incorporates both mechanical elements and electronic components that facilitate the operation of the motor-generator, sense the operational condition of the motor-generator (e.g., "healthy" or "faulted," among other possible operational conditions), and/or enable modification of operational parameters of the motor-generator (e.g., "motoring" mode, "generating" mode, and/or configuring the manner in which the motor-generator operates).

As described herein, a "fault" may be any kind of failure or problem that affects the operation of a device. A fault may refer to an electronic component experiencing a high voltage or a large current that causes the device to operate differently than its intended use (e.g., causes the device to act as a short, an open, or affects other operational parameters of the device such that it performs substantially differently than its intended design). A fault may also refer to a problem during the execution of software or firmware that causes a device to behave in some unintended way (e.g., a software bug, firmware malfunction, etc.). A fault may additionally refer to a change in an environmental condition that causes a device's operation to depart from its nominal operation (e.g., loss of AC power from the grid causes the bidirectional power converter to stop operating, causing its DC voltage output to drop). It should be understood that, generally speaking, a "fault" refers to any departure from normal, expected, or designed operation that may affect the operation of the power conversion system and/or its constituent components.

It should be understood that the above examples are provided for illustrative purposes, and should not be construed as limiting. As such, the method may additionally or alternatively include other features or include fewer features, without departing from the scope of this application.

II. EXAMPLE SYSTEMS

FIG. 1 depicts an AWT 100, according to an example embodiment. In particular, the AWT 100 includes a ground station 110, a tether 120, and an aerial vehicle 130. As shown in FIG. 1, the aerial vehicle 130 may be connected to the tether 120, and the tether 120 may be connected to the ground station 110. In this example, the tether 120 may be attached to the ground station 110 at one location on the ground station 110, and attached to the aerial vehicle 130 at two locations on the aerial vehicle 130. However, in other examples, the tether 120 may be attached at multiple locations to any part of the ground station 110 and/or the aerial vehicle 130.

The ground station 110 may be used to hold and/or support the aerial vehicle 130 until it is in an operational mode. The ground station 110 may also be configured to allow for the repositioning of the aerial vehicle 130 such that deploying of the device is possible. Further, the ground station 110 may be further configured to receive the aerial vehicle 130 during a landing. The ground station 110 may be formed of any material that can suitably keep the aerial vehicle 130 attached and/or anchored to the ground while in hover flight, forward flight, crosswind flight.

In addition, the ground station 110 may include one or more components (not shown), such as a winch, that may vary a length of the tether 120. For example, when the aerial vehicle 130 is deployed, the one or more components may be configured to pay out and/or reel out the tether 120. In some implementations, the one or more components may be configured to pay out and/or reel out the tether 120 to a predetermined length. As examples, the predetermined length could be equal to or less than a maximum length of the tether 120. Further, when the aerial vehicle 130 lands in the ground station 110, the one or more components may be configured to reel in the tether 120.

The tether 120 may transmit electrical energy generated by the aerial vehicle 130 to the ground station 110. In addition, the tether 120 may transmit electricity to the aerial vehicle 130 in order to power the aerial vehicle 130 for takeoff, landing, hover flight, and/or forward flight. The tether 120 may be constructed in any form and using any material which may allow for the transmission, delivery, and/or harnessing of electrical energy generated by the aerial vehicle 130 and/or transmission of electricity to the aerial vehicle 130. The tether 120 may also be configured to withstand one or more forces of the aerial vehicle 130 when the aerial vehicle 130 is in an operational mode. For example, the tether 120 may include a core configured to withstand one or more forces of the aerial vehicle 130 when the aerial vehicle 130 is in hover flight, forward flight, and/or crosswind flight. The core may be constructed of any high strength fibers. In some examples, the tether 120 may have a fixed length and/or a variable length. For instance, in at least one such example, the tether 120 may have a length of 140 meters.

The aerial vehicle 130 may be configured to fly substantially along a path to generate electrical energy. The term "substantially along," as used in this disclosure, refers to exactly along and/or one or more deviations from exactly along that do not significantly impact generation of electrical energy as described herein and/or transitioning an aerial vehicle between certain flight modes as described herein.

The aerial vehicle 130 may include or take the form of various types of devices, such as a kite, a helicopter, a wing and/or an airplane, among other possibilities. The aerial vehicle 130 may be formed of solid structures of metal, plastic and/or other polymers. The aerial vehicle 130 may be formed of any material which allows for a high thrust-to-weight ratio and generation of electrical energy which may be used in utility applications. Additionally, the materials may be chosen to allow for a lightning hardened, redundant and/or fault tolerant design which may be capable of handling large and/or sudden shifts in wind speed and wind direction. Other materials may be possible as well.

As shown in FIG. 1, the aerial vehicle 130 may include a main wing 131, a front section 132, rotor connectors 133A-

B, rotors 134A-D, a tail boom 135, a tail wing 136, and a vertical stabilizer 137. Any of these components may be shaped in any form which allows for the use of components of lift to resist gravity and/or move the aerial vehicle 130 forward.

The main wing 131 may provide a primary lift for the aerial vehicle 130. The main wing 131 may be one or more rigid or flexible airfoils, and may include various control surfaces, such as winglets, flaps, rudders, elevators, etc. The control surfaces may be used to stabilize the aerial vehicle 130 and/or reduce drag on the aerial vehicle 130 during hover flight, forward flight, and/or crosswind flight.

The main wing 131 may be any suitable material for the aerial vehicle 130 to engage in hover flight, forward flight, and/or crosswind flight. For example, the main wing 131 may include carbon fiber and/or e-glass. Moreover, the main wing 131 may have a variety dimensions. For example, the main wing 131 may have one or more dimensions that correspond with a conventional wind turbine blade. As another example, the main wing 131 may have a span of 8 meters, an area of 4 meters squared, and an aspect ratio of 15. The front section 132 may include one or more components, such as a nose, to reduce drag on the aerial vehicle 130 during flight.

The rotor connectors 133A-B may connect the rotors 134A-D to the main wing 131. In some examples, the rotor connectors 133A-B may take the form of or be similar in form to one or more pylons. In this example, the rotor connectors 133A-B are arranged such that the rotors 134A-D are spaced between the main wing 131. In some examples, a vertical spacing between corresponding rotors (e.g., rotor 134A and rotor 134B or rotor 134C and rotor 134D) may be 0.9 meters.

The rotors 134A-D may configured to drive one or more generators for the purpose of generating electrical energy. In this example, the rotors 134A-D may each include one or more blades, such as three blades. The one or more rotor blades may rotate via interactions with the wind and which could be used to drive the one or more generators. In addition, the rotors 134A-D may also be configured to provide a thrust to the aerial vehicle 130 during flight. With this arrangement, the rotors 134A-D may function as one or more propulsion units, such as a propeller. Although the rotors 134A-D are depicted as four rotors in this example, in other examples the aerial vehicle 130 may include any number of rotors, such as less than four rotors or more than four rotors.

The tail boom 135 may connect the main wing 131 to the tail wing 136. The tail boom 135 may have a variety of dimensions. For example, the tail boom 135 may have a length of 2 meters. Moreover, in some implementations, the tail boom 135 could take the form of a body and/or fuselage of the aerial vehicle 130. And in such implementations, the tail boom 135 may carry a payload.

The tail wing 136 and/or the vertical stabilizer 137 may be used to stabilize the aerial vehicle and/or reduce drag on the aerial vehicle 130 during hover flight, forward flight, and/or crosswind flight. For example, the tail wing 136 and/or the vertical stabilizer 137 may be used to maintain a pitch of the aerial vehicle 130 during hover flight, forward flight, and/or crosswind flight. In this example, the vertical stabilizer 137 is attached to the tail boom 135, and the tail wing 136 is located on top of the vertical stabilizer 137. The tail wing 136 may have a variety of dimensions. For example, the tail wing 136 may have a length of 2 meters. Moreover, in some examples, the tail wing 136 may have a surface area of 0.45 meters squared. Further, in some examples, the tail wing 136 may be located 1 meter above a center of mass of the aerial vehicle 130.

While the aerial vehicle 130 has been described above, it should be understood that the methods and systems described herein could involve any suitable aerial vehicle that is connected to a tether, such as the tether 120.

B. Example Components of an AWT

Figure 2:
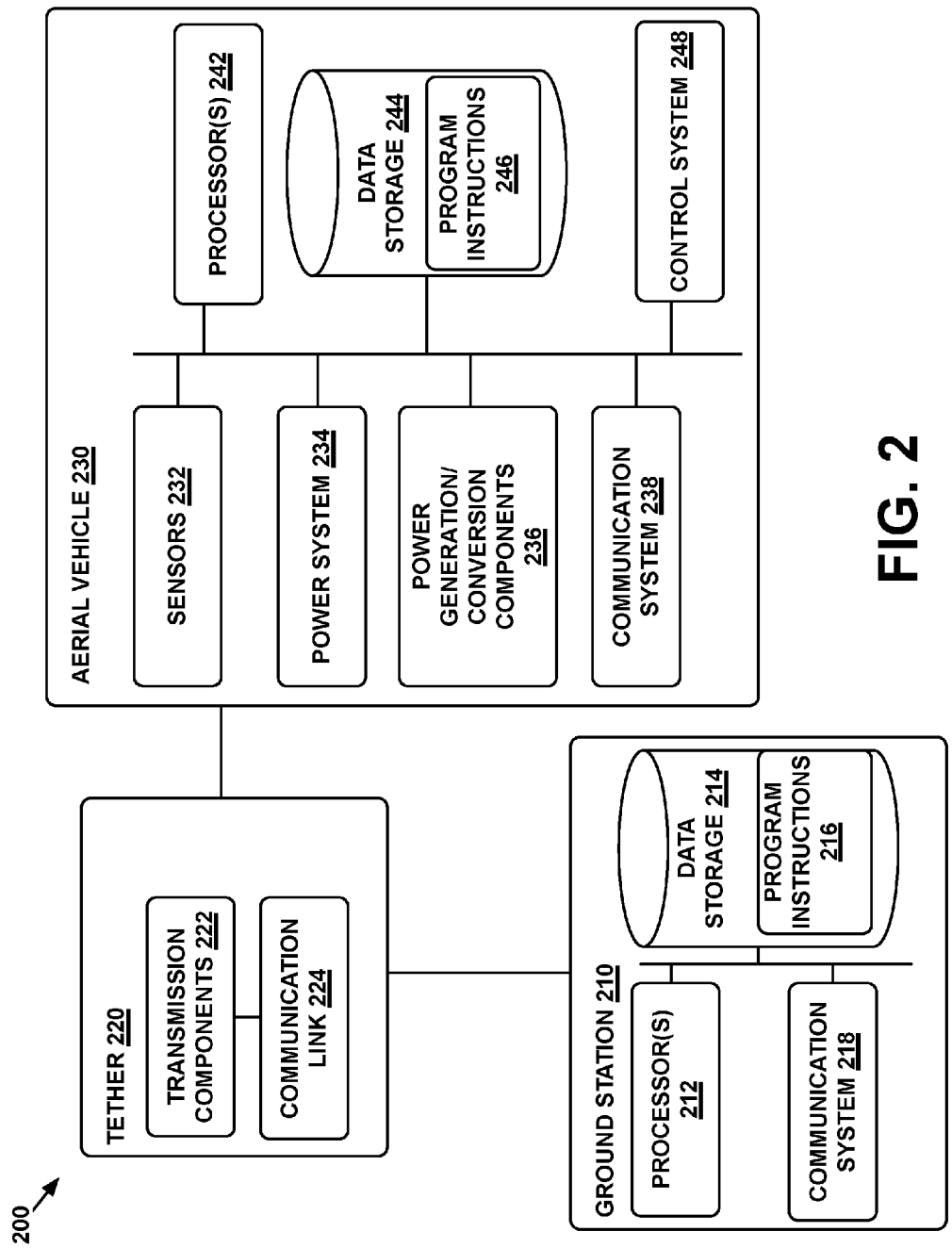
FIG. 2 is a simplified block diagram depicting components of an AWT, according to an example embodiment.

FIG. 2 is a simplified block diagram illustrating components of the AWT 200. The AWT 200 may take the form of or be similar in form to the AWT 100. In particular, the AWT 200 includes a ground station 210, a tether 220, and an aerial vehicle 230. The ground station 210 may take the form of or be similar in form to the ground station 110, the tether 220 may take the form of or be similar in form to the tether 120, and the aerial vehicle 230 may take the form of or be similar in form to the aerial vehicle 130.

As shown in FIG. 2, the ground station 210 may include one or more processors 212, data storage 214, and program instructions 216. A processor 212 may be a general-purpose processor or a special purpose processor (e.g., digital signal processors, application specific integrated circuits, etc.). The one or more processors 212 can be configured to execute computer-readable program instructions 216 that are stored in a data storage 214 and are executable to provide at least part of the functionality described herein.

The data storage 214 may include or take the form of one or more computer-readable storage media that may be read or accessed by at least one processor 212. The one or more computer-readable storage media can include volatile and/or non-volatile storage components, such as optical, magnetic, organic or other memory or disc storage, which may be integrated in whole or in part with at least one of the one or more processors 212. In some embodiments, the data storage 214 may be implemented using a single physical device (e.g., one optical, magnetic, organic or other memory or disc storage unit), while in other embodiments, the data storage 214 can be implemented using two or more physical devices.

As noted, the data storage 214 may include computer-readable program instructions 216 and perhaps additional data, such as diagnostic data of the ground station 210. As such, the data storage 214 may include program instructions to perform or facilitate some or all of the functionality described herein.

In a further respect, the ground station 210 may include a communication system 218. The communications system 218 may include one or more wireless interfaces and/or one or more wireline interfaces, which allow the ground station 210 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network. The ground station 210 may communicate with the aerial vehicle 230, other ground stations, and/or other entities (e.g., a command center) via the communication system 218.

In an example embodiment, the ground station 210 may include communication systems 218 that allows for both short-range communication and long-range communication. For example, the ground station 210 may be configured for short-range communications using Bluetooth and for long-range communications under a CDMA protocol. In such an embodiment, the ground station 210 may be configured to function as a "hot spot"; or in other words, as a gateway or proxy between a remote support device (e.g., the tether 220, the aerial vehicle 230, and other ground stations) and one or more data networks, such as cellular network and/or the Internet. Configured as such, the ground station 210 may facilitate data communications that the remote support device would otherwise be unable to perform by itself.

For example, the ground station 210 may provide a Wi-Fi connection to the remote device, and serve as a proxy or gateway to a cellular service provider's data network, which the ground station 210 might connect to under an LTE or a 3G protocol, for instance. The ground station 210 could also serve as a proxy or gateway to other ground stations or a command station, which the remote device might not be able to otherwise access.

Moreover, as shown in FIG. 2, the tether 220 may include transmission components 222 and a communication link 224. The transmission components 222 may be configured to transmit electrical energy from the aerial vehicle 230 to the ground station 210 and/or transmit electrical energy from the ground station 210 to the aerial vehicle 230. The transmission components 222 may take various different forms in various different embodiments. For example, the transmission components 222 may include one or more conductors that are configured to transmit electricity. And in at least one such example, the one or more conductors may include aluminum and/or any other material which allows for the conduction of electric current. Moreover, in some implementations, the transmission components 222 may surround a core of the tether 220 (not shown).

The ground station 210 could communicate with the aerial vehicle 230 via the communication link 224. The communication link 224 may be bidirectional and may include one or more wired and/or wireless interfaces. Also, there could be one or more routers, switches, and/or other devices or networks making up at least a part of the communication link 224.

Further, as shown in FIG. 2, the aerial vehicle 230 may include one or more sensors 232, a power system 234, power generation/conversion components 236, a communication system 238, one or more processors 242, data storage 244, and program instructions 246, and a control system 248.

The sensors 232 could include various different sensors in various different embodiments. For example, the sensors 232 may include a global a global positioning system (GPS) receiver. The GPS receiver may be configured to provide data that is typical of well-known GPS systems (which may be referred to as a global navigation satellite system (GNNS)), such as the GPS coordinates of the aerial vehicle 230. Such GPS data may be utilized by the AWT 200 to provide various functions described herein.

As another example, the sensors 232 may include one or more wind sensors, such as one or more pitot tubes. The one or more wind sensors may be configured to detect apparent and/or relative wind. Such wind data may be utilized by the AWT 200 to provide various functions described herein.

Still as another example, the sensors 232 may include an inertial measurement unit (IMU). The IMU may include both an accelerometer and a gyroscope, which may be used together to determine the orientation of the aerial vehicle 230. In particular, the accelerometer can measure the orientation of the aerial vehicle 230 with respect to earth, while the gyroscope measures the rate of rotation around an axis, such as a centerline of the aerial vehicle 230. IMUs are commercially available in low-cost, low-power packages. For instance, the IMU may take the form of or include a miniaturized MicroElectroMechanical System (MEMS) or a NanoElectroMechanical System (NEMS). Other types of IMUs may also be utilized. The IMU may include other sensors, in addition to accelerometers and gyroscopes, which may help to better determine position. Two examples of such sensors are magnetometers and pressure sensors. Other examples are also possible.

While an accelerometer and gyroscope may be effective at determining the orientation of the aerial vehicle 230, slight errors in measurement may compound over time and result in a more significant error. However, an example aerial vehicle 230 may be able mitigate or reduce such errors by using a magnetometer to measure direction. One example of a magnetometer is a low-power, digital 3-axis magnetometer, which may be used to realize an orientation independent electronic compass for accurate heading information. However, other types of magnetometers may be utilized as well.

The aerial vehicle 230 may also include a pressure sensor or barometer, which can be used to determine the altitude of the aerial vehicle 230. Alternatively, other sensors, such as sonic altimeters or radar altimeters, can be used to provide an indication of altitude, which may help to improve the accuracy of and/or prevent drift of the IMU.

As noted, the aerial vehicle 230 may include the power system 234. The power system 234 could take various different forms in various different embodiments. For example, the power system 234 may include one or more batteries for providing power to the aerial vehicle 230. In some implementations, the one or more batteries may be rechargeable and each battery may be recharged via a wired connection between the battery and a power supply and/or via a wireless charging system, such as an inductive charging system that applies an external time-varying magnetic field to an internal battery and/or charging system that uses energy collected from one or more solar panels.

As another example, the power system 234 may include one or more motors or engines for providing power to the aerial vehicle 230. In some implementations, the one or more motors or engines may be powered by a fuel, such as a hydrocarbon-based fuel. And in such implementations, the fuel could be stored on the aerial vehicle 230 and delivered to the one or more motors or engines via one or more fluid conduits, such as piping. In some implementations, the power system 234 may be implemented in whole or in part on the ground station 210.

As noted, the aerial vehicle 230 may include the power generation/conversion components 236. The power generation/conversion components 326 could take various different forms in various different embodiments. For example, the power generation/conversion components 236 may include one or more generators, such as high-speed, direct-drive generators. With this arrangement, the one or more generators may be driven by one or more rotors, such as the rotors 134A-D. And in at least one such example, the one or more generators may operate at full rated power wind speeds of 11.5 meters per second at a capacity factor which may exceed 60 percent, and the one or more generators may generate electrical power from 40 kilowatts to 600 megawatts.

Moreover, as noted, the aerial vehicle 230 may include a communication system 238. The communication system 238 may take the form of or be similar in form to the communication system 218. The aerial vehicle 230 may communicate with the ground station 210, other aerial vehicles, and/or other entities (e.g., a command center) via the communication system 238.

In some implementations, the aerial vehicle 230 may be configured to function as a "hot spot"; or in other words, as a gateway or proxy between a remote support device (e.g., the ground station 210, the tether 220, other aerial vehicles) and one or more data networks, such as cellular network and/or the Internet. Configured as such, the aerial vehicle 230 may facilitate data communications that the remote support device would otherwise be unable to perform by itself.

For example, the aerial vehicle 230 may provide a WiFi connection to the remote device, and serve as a proxy or gateway to a cellular service provider's data network, which the aerial vehicle 230 might connect to under an LTE or a 3G protocol, for instance. The aerial vehicle 230 could also serve as a proxy or gateway to other aerial vehicles or a command station, which the remote device might not be able to otherwise access.

As noted, the aerial vehicle 230 may include the one or more processors 242, the program instructions 244, and the data storage 246. The one or more processors 242 can be configured to execute computer-readable program instructions 246 that are stored in the data storage 244 and are executable to provide at least part of the functionality described herein. The one or more processors 242 may take the form of or be similar in form to the one or more processors 212, the data storage 244 may take the form of or be similar in form to the data storage 214, and the program instructions 246 may take the form of or be similar in form to the program instructions 216.

Moreover, as noted, the aerial vehicle 230 may include the control system 248. In some implementations, the control system 248 may be configured to perform one or more functions described herein. The control system 248 may be implemented with mechanical systems and/or with hardware, firmware, and/or software. As one example, the control system 248 may take the form of program instructions stored on a non-transitory computer readable medium and a processor that executes the instructions. The control system 248 may be implemented in whole or in part on the aerial vehicle 230 and/or at least one entity remotely located from the aerial vehicle 230, such as the ground station 210. Generally, the manner in which the control system 248 is implemented may vary, depending upon the particular application.

III. EXAMPLE SYSTEMS

Figure 3A:
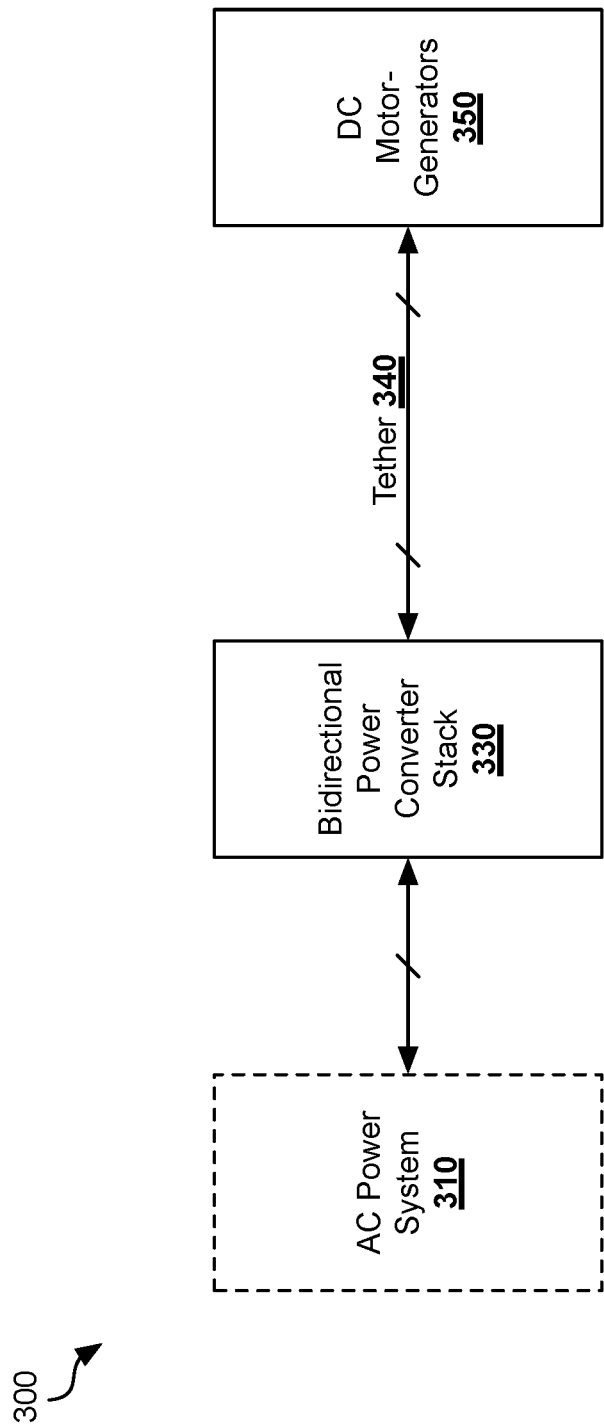
FIG. 3A is a simplified block diagram illustrating a bidirectional power conversion system, according to an example embodiment.

FIG. 3A is a simplified block diagram illustrating a bidirectional power conversion system 300, according to an example embodiment. The bidirectional power conversion system 300 includes AC power system 310, bidirectional power converter stack 330, tether 340, and DC motor-generators 350. The bidirectional power converter stack 330 may, in one operational mode, perform AC-to-DC power conversion from the AC power system 310 to the DC motor-generators 350 via the tether 340. The bidirectional power converter stack 330 may also, in another operational mode, perform DC-to-AC power conversion from the DC motor-generators 350 (via the tether 340) to the AC power system 310. Although not illustrated in FIG. 3A, the bidirectional power conversion system 300 may include other components, such as intermediate conversion circuitry (which may be included within a subsystem such as ground station 210) between the bidirectional power converter stack 330 and the DC motor-generators 350.

The AC power system 310 may be any combination of hardware and/or software components that collectively form a power system that operates using AC power. The AC power system 310 may be a set of outlets, terminals, or other components that other devices may connect to for drawing AC power. The AC power system 310 may also be a power grid, from which AC power is drawn and/or to which AC power is provided.

The AC power system 310 may operate according to a particular AC power scheme. For example, AC power system 310 may operate in three phases at 120 V with a frequency of 60 Hz. Other AC power systems may also be implemented. The AC power system 310 may provide such multi-phase AC power to the bidirectional power converter stack 330 via, for example, one or more physical wire connections.

The bidirectional power converter stack 330 may be any combination of hardware and/or software components that collectively perform bidirectional power conversion. In one direction, the bidirectional power converter stack 330 may receive AC power from the AC power system 310, which it converts to DC power that is delivered to the tether 340. The bidirectional power converter stack 330 may be comprised of one or more bidirectional power converters—such as bidirectional power converter 320 depicted in FIG. 3B—coupled to each other in series to form a converter stack (e.g., as shown in FIG. 3C).

The bidirectional power converter stack 330 may be designed or configured to receive a particular type of AC power (e.g., of a particular peak-to-peak voltage, a particular amount of current, with a particular frequency, etc.), which it converts to a particular type of DC power (e.g., a particular DC voltage level). In some implementations, the bidirectional power converter stack 330 may be configurable to adjust its operation. For example, the bidirectional power converter stack 330 may receive an input that designates a DC voltage level output (using, for example, a configurable buck-boost converter). As another example, the bidirectional power converter stack 330 may be configurable to receive and/or provide AC power of a particular type.

The tether 340 may be any physical connection capable of conveying DC power between the bidirectional power converter stack 330 and the DC motor-generators 350. In some examples, the tether 340 may be attached to an aerial vehicle to provide both a mechanical link to the aerial vehicle, as well as a medium through which electrical power is transmitted to and/or from the DC motor-generators 350. The tether 340 may also be configured to carry one or more informational signals (either digital data or analog waveforms) that may be provided to other components, such as the bidirectional power converter stack 330, a controller, a computing device, etc. These informational signals could be sensor measurements that detect, among other things, failures or faults of components within the aerial vehicle, such as the failure of a motor-generator.

The DC motor-generators 350 may be any combination of electromechanical devices that are capable of receiving power to magnetically drive a rotor and of generating power by spinning up the rotor. Any number of motor-generators may be connected to each other, in any combination of series or parallel connections, in order to form the DC motor-generators 350. The DC motor-generators 350 may operate in two different "modes": a motoring mode and a generating mode. In the motoring mode, the DC motor-generators 350 may draw electric power from the tether 340, which cause the motor-generators to act as motors that drive a load (e.g., turbines coupled to rotors of the motor-generators). The amount of power drawn by the DC motor-generators 350 from the tether 340 may depend on a variety of factors, including the instantaneous speed of the turbines. In the generating mode, the DC motor-generators 350 may receive kinetic power (from, for example, wind that spins up turbines coupled to the DC motor-generators 350) and convert that power into electric power that is sent along the tether 340 to devices connected thereto.

The DC motor-generators 350 may be designed to operate within a particular voltage range, and may be rated to withstand certain transient voltages and/or certain sustained voltages. The configuration of the DC motor-generators 350—that is, the manner in which they are connected to each other and to the tether 340, may be such that each motor-generator receives voltage within its designed tolerances during normal operation. For example, if the tether 340 carries a DC voltage of 2000 V, and each motor-generator is designed to operate at or around 500 V, then a possible configuration for the DC motor-generators 350 is to have four motor-generators connected to each other in series. If each motor-generator is instead designed to operate at or around 1000 V, then a possible configuration for the DC motor-generators 350 would be to have two sets of two series-connected motor-generators that are connected in parallel (such that each set of series-connected motor-generators receives the 2000 V tether voltage). A variety of DC motor-generators 350 configurations may be possible; it should be understood that the configurations may depend on a variety of factors, including the operational voltage or voltages of the tether 340, the operational voltage ranges of the motor-generators, and/or the number of motor-generators within the DC motor-generators 350, among other possible factors.

Figure 3B:
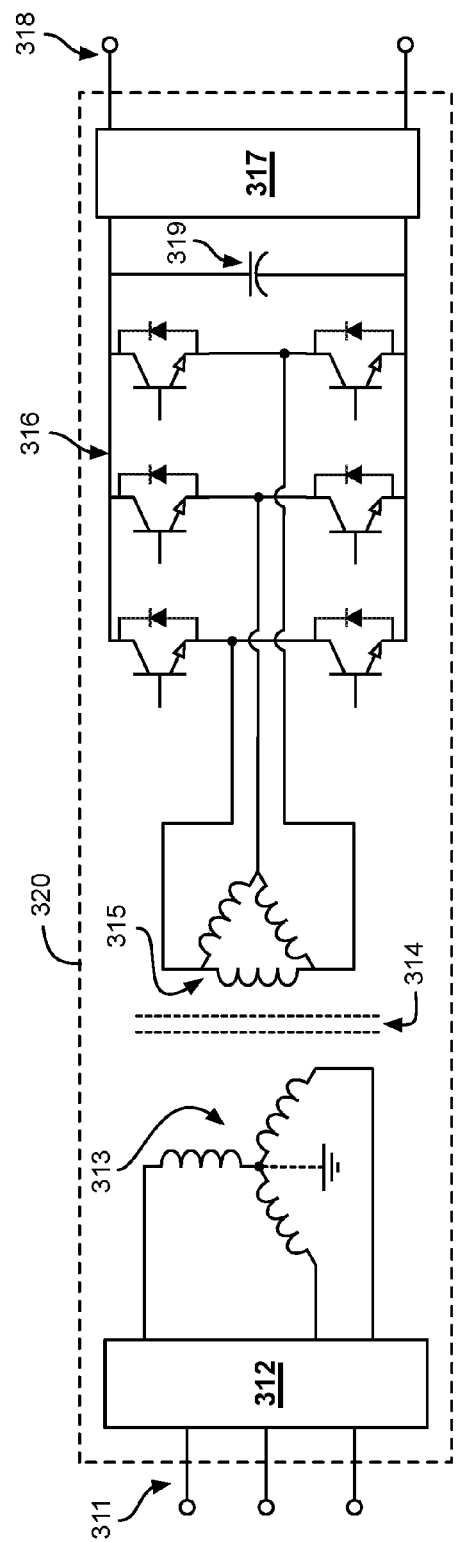
FIG. 3B is a schematic diagram of a bidirectional power converter, according to an example embodiment.
Figure 3C:
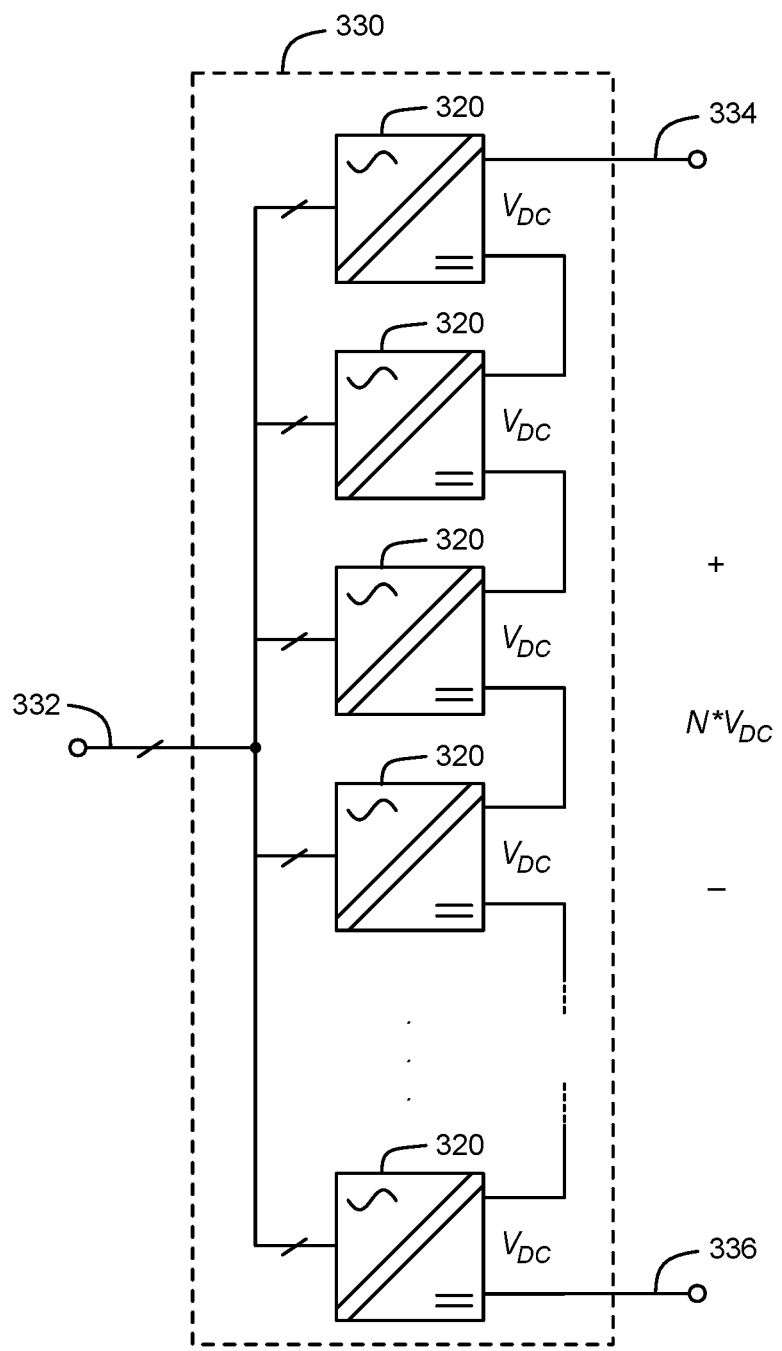
FIG. 3C is a schematic diagram of a bidirectional power converter stack, according to an example embodiment.

FIG. 3B is a schematic diagram of a bidirectional power converter 320, according to an example embodiment. The bidirectional power converter 320 interfaces with three-phase AC power at the AC terminals 311 and with DC power at the DC terminals 318. The bidirectional power converter 320 may operate in at least two modes, including an AC-to-DC mode and a DC-to-AC mode.

In the AC-to-DC mode, the bidirectional power converter 320 receives AC power at the AC terminals 311, which is provided to AC-side circuitry 312. The AC-side circuitry 312 may include electronic components for switching protection, filtering, voltage sensing, overvoltage protection, overcurrent protection, and/or electronic components for other purposes. The AC-side circuitry 312 then outputs an AC signal to a three-phase isolation section, which includes a transformer formed by the inductive elements 313, the dielectric barrier 314, and the inductive elements 315. In various implementations, the three-phase isolation section may step-up or step-down the peak-to-peak voltage, depending on the desired output voltage at the DC terminals 318. The isolated AC signal output by the inductive elements 315 are then provided to the three-phase switching bridge 316, which rectifies the AC signal into a DC signals. That DC signal may then be smoothed out by the capacitor at the output of the three-phase switching bridge 316. The DC signal is then provided to the DC-side circuitry 317, which may include may include electronic components for switching protection, filtering, voltage sensing, overvoltage protection, overcurrent protection, and/or electronic components for other purposes. The output of the DC-side circuitry 317 may be a DC signal that is output at the DC terminals 318.

In the reverse direction (i.e., in the DC-to-AC mode), the bidirectional power converter 320 receives DC power at the DC terminals 318, which flows through the DC-side circuitry 317 and is provided to the three-phase switching bridge 316. The three-phase switching bridge 316, in combination with the inductive elements 315, may act as an inverter to generate an AC signal based on the DC power. That AC signal may then flow across the three-phase isolation section and into the AC-side circuitry 312. The output of the AC-side circuitry 312 may be provided to the AC terminals 311.

Note that the bidirectional power converter 320 may contain additional components to facilitate the AC-to-DC conversion and/or the DC-to-AC conversion. For example, a bidirectional power converter 320 may include a controller and/or a processor that carries out instructions to operate the bidirectional power converter 320. For example, the switches in the three-phase switching bridge 316 may be controlled by such a controller or processor in order to generate an AC signal of a desired frequency and/or of a desired voltage.

FIG. 3C is a schematic diagram of a bidirectional power converter stack 330, according to an example embodiment. The bidirectional power converter stack 330 is formed from a set of bidirectional power converters (e.g., bidirectional power converter 320). In the example configuration depicted in FIG. 3C, the DC outputs of the bidirectional power converters 320 are tied to each other in series, such that the DC output voltage $V_{DC}$ from each bidirectional power converter contributes to the overall voltage of the DC bus, which is defined by DC lines 334, 336. In this example configuration, there are N number of bidirectional power converters in the stack; therefore, the DC bus voltage across DC lines 334, 336 is $N*V_{DC}$.

Each bidirectional power converter receives an AC voltage from the AC line 332. The AC line 332 may be, for example, an AC mains voltage line from a grid or other power source (e.g., 120 V RMS AC voltage at 60 Hz, 240 V RMS AC voltage at 50 Hz, etc.). There may be any number of phases in the AC line 332 (e.g., 2 phase AC voltage, 3 phase AC voltage, etc.), and each of those phases may be coupled to its own distinct line within the AC line 332. In FIG. 3C, the AC line 332 may be formed by multiple distinct lines, as denoted by the slash in the AC line 332.

When power flows from the AC side to the DC side (in FIG. 3C, from left to right), the properties of the AC voltage may be defined by an AC power grid, an AC mains line, or another AC power source connected to the AC line 332. In some instances, the AC voltage may possess properties that are compatible with the AC inputs on the bidirectional power converters in the stack. When power flows from the DC side to the AC side (in FIG. 3C, from right to left), the properties of the AC voltage may be defined by the manner of operation of the bidirectional power converters in the stack. For instance, the bidirectional power converters may include circuitry and control that facilitates the conversion from a DC voltage to a time-varying AC voltage; thus, the properties of the AC voltage may be defined by operational aspects of the bidirectional power converters. Furthermore, the bidirectional power converters may be configurable to change the properties of the AC voltage signals that they output; for example, a bidirectional power converter may include a controller with pre-set configurations for different AC voltage standards.

The bidirectional power converter stack 330 may be grounded at a number of different locations. The bidirectional power converter stack 330 may be grounded at the DC line 334, such that the DC bus voltage ranges from 0 V to $-N^*V_{DC}$. The bidirectional power converter stack 330 may also be grounded at the DC line 336, such that the DC bus voltage ranges from $-N^*V_{DC}$ to 0 V. In some implementations, the bidirectional power converter stack 330 may be grounded at some intermediate point between the DC lines 334, 336 such that the DC bus voltage ranges from some positive voltage to some negative voltage (relative to ground), where the difference between the DC lines 334, 336 is equal to $N^*V_{DC}$.

The particular grounding technique and configuration may vary among implementations and/or operational conditions. For instance, grounding the bidirectional power converter stack 330 at a center point between the DC lines 334, 336 may reduce the maximum voltage stresses experienced by the components within the converters and/or components connected to the DC bus. In various implementations, electronic components may be rated to safely operate within particular DC voltage ranges, and the center grounding may allow for the bidirectional power converter stack 330 to be implemented with such electronic components. Furthermore, the center grounding may reduce voltage stresses on the isolation barriers of the bidirectional power converters (as compared to the voltage stresses experienced by the isolation barriers when the bidirectional power converter stack 330 is grounded at a DC bus line 334 or 336). In some instances, the DC side may not be grounded at all (i.e., "floating"), and is instead limited using voltage clamps or the like.

Additionally, in some implementations, the DC side grounding may be an impedance ground. Such impedance grounding may be implemented in order to limit the current flowing to ground in the event of a fault. The electrical component or components may also be monitored (e.g., voltage across them, current flowing through them, etc.), which may serve as a basis for detecting faults.

The AC side of the bidirectional power converter stack 330 may be referenced to earth ground (e.g., through a neutral line, via voltage clamps or surge arrestors, etc.). The AC ground referencing may be an "artificial" neutral grounding (e.g., a fourth "ground" phase in a three-phase AC system) that at least permits leakage or transient currents to be routed to ground.

During various fault scenarios, the manner of grounding may be altered dynamically, either as a result of the fault itself or as an intended result of some fault mitigation process. For example, if a particular bidirectional power converter in the stack fails whose DC line was serving as a reference to ground, the loss of the ground reference may leave the system susceptible to damage from transient currents that have no path to ground. Additionally, the loss of the ground reference may cause the DC lines to have unpredictable DC bias voltages (e.g., on the order of the RMS voltage of the AC voltage). Such DC voltage drifts may impose stresses on the isolation barriers of the bidirectional power converters, which could in turn could put those bidirectional power converters at risk of failing.

Thus, it should be understood that the location of a ground reference of the bidirectional power converter stack 330, if present, may vary depending on the design of the system and the circumstances of its operation.

Figure 3D:
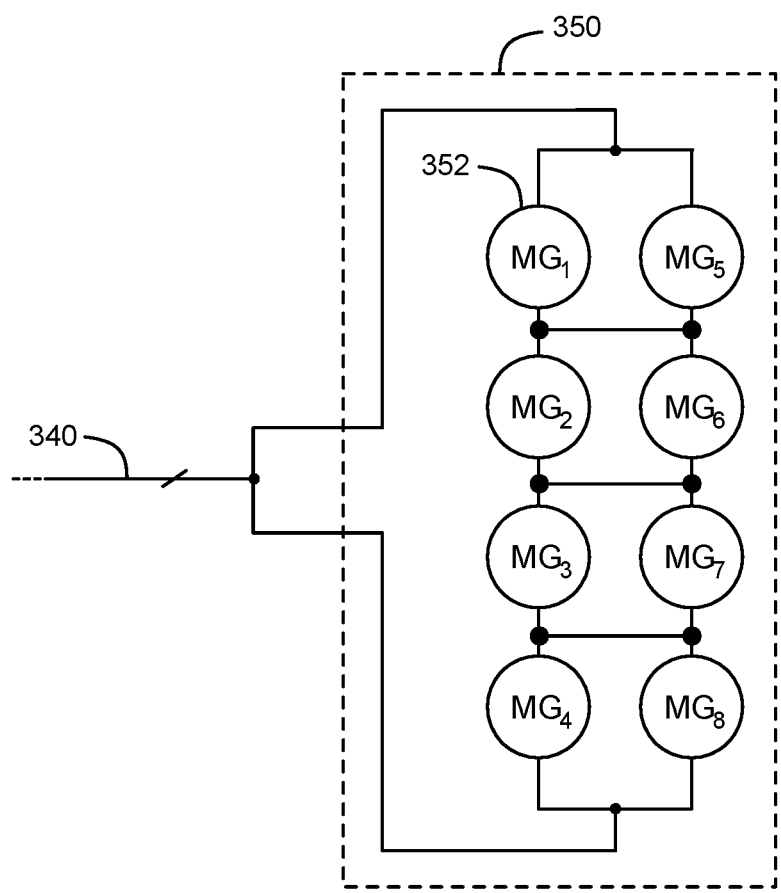
FIG. 3D is a schematic diagram of an example motor-generator configuration, according to an example embodiment.

FIG. 3D is a schematic diagram of an example motor-generator configuration 350, according to an example embodiment. The DC motor-generators 350 may be coupled to the tether 340, which may serve as a transmission medium through which DC power is supplied to the DC motor-generators 350 and/or to which power from the DC motor-generators 350 is provided to other components connected to the tether 340.

Any number of motor-generators may be included within the DC motor-generators 350. The number of motor-generators may depend upon, for example, the particular design of the AWT that houses the DC motor-generators 350. Additionally, the manner in which the DC motor-generators are configured (e.g., how they are coupled to each other and/or the tether 340) may depend on the tether 340 voltage and/or a desired amount of redundancy of the system.

In the example depicted in FIG. 3D, eight motor generators form the DC motor-generators 350. Four motor-generators—$MG_1$, $MG_2$, $MG_3$, and $MG_4$—are connected to each other in series. The other four motor-generators—$MG_5$, $MG_6$, $MG_7$, and $MG_8$ are also connected to each other in series. The two sets of series connected motor-generators are connected to each other in parallel, with the parallel connection locations coupled to opposite ends of the tether 340 carrying DC power. Additionally, the negative terminals of $MG_1$ and $MG_5$ are connected, the negative terminals of $MG_2$ and $MG_6$ are connected, and the negative terminals of $MG_3$ and $MG_7$ are connected.

The tether 340 may include two conductive lines that are coupled to DC lines 334, 336. The top of the motor-generator stack (the node shared by $MG_1$ and $MG_5$) may be connected to one of the DC lines 334, 336, while the bottom of the motor-generator stack (the node shared by $MG_4$ and $MG_8$) may be connected to the other DC line 334, 336. As one example implementation, the DC lines 334, 336 may have a voltage potential of 3400 V across them; in this example, each motor-generator may operate at 850 V, such that a series of four motor-generators can safely receive the 3400 V.

It should be understood that the configurations, schematics, and circuit topologies depicted in FIGS. 3A, 3B, 3C, and 3D are merely examples and are provided for explanatory purposes. Some components may be added, removed, or replaced with alternative components in order to form a bidirectional power conversion system. It should be understood that fault tolerance techniques, fault mitigation techniques, safety improvements, and/or compliance maintenance techniques described herein could be applied to any kind of power conversion system beyond those explicitly disclosed herein.

IV. EXAMPLE MULTI-AWT SYSTEM

Figure 4:
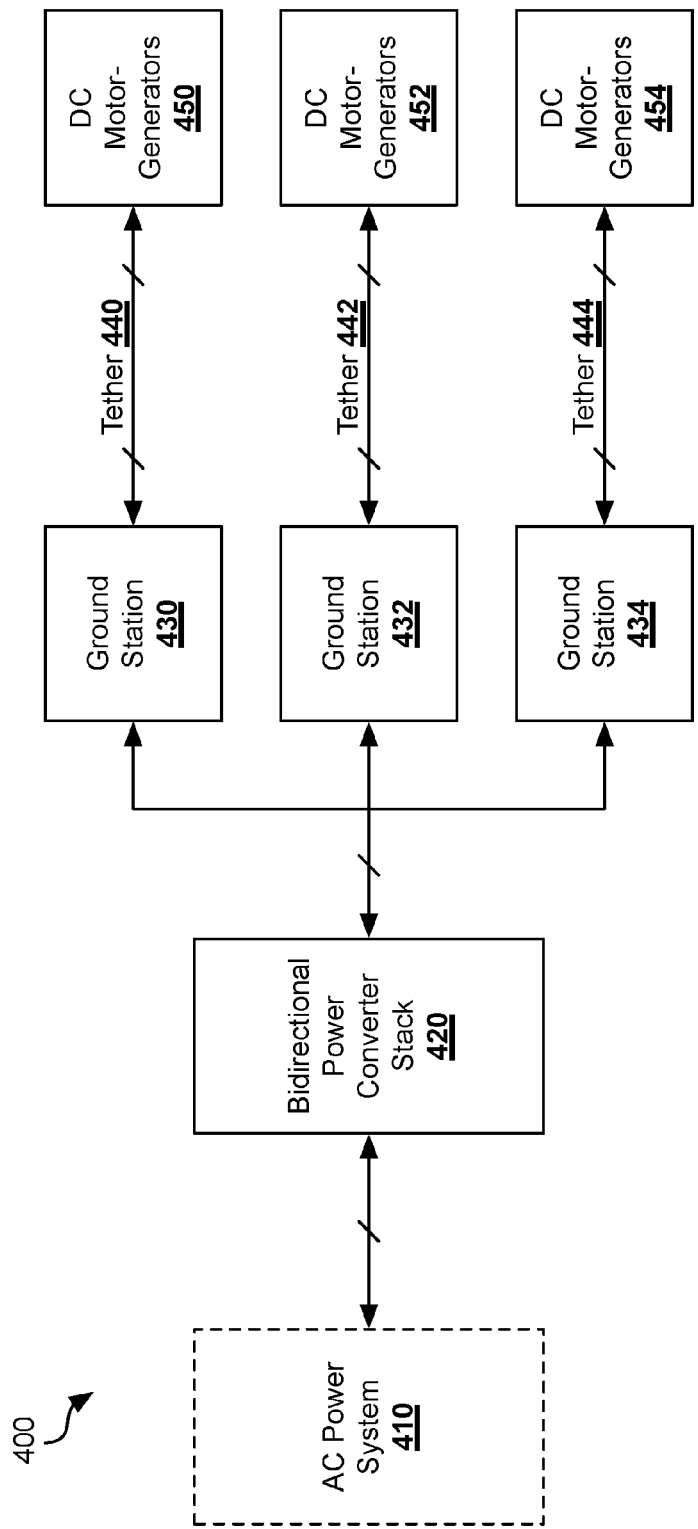
FIG. 4 is a simplified block diagram illustrating a power distribution system for multiple Airborne Wind Turbines, according to an example embodiment.

FIG. 4 is a simplified block diagram illustrating a power distribution system 400, according to an example embodiment. The power distribution system 400 includes an AC power system 410, a bidirectional power converter stack 420, and ground stations 430, 432, and 434 coupled to DC motor-generators 450, 452, and 454 via tether 440, 442, and 444, respectively. The power distribution system 400 is similar to the power distribution system 300 illustrated in FIG. 3A, but includes three sets of ground stations, tethers, and motor-generators. The power distribution system 400 may be referred to herein as a "multi-kite" or "multi-AWT" system.

The AC power system 410 may be any power system from which AC power may be drawn and to which AC power may be delivered. The AC power system 410 may be similar to or the same as AC power system 310.

Figure 5A:
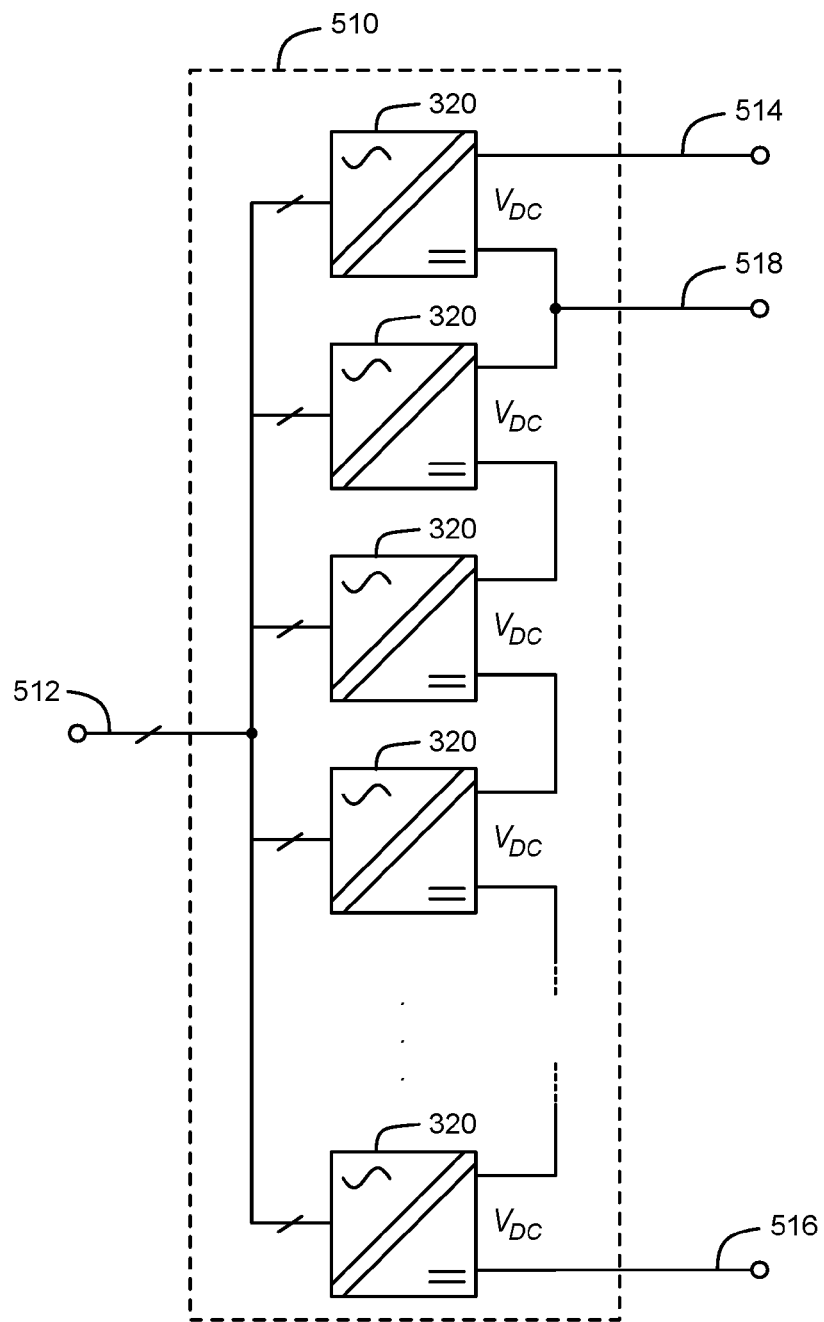
FIG. 5A is a schematic diagram of a bidirectional power converter stack with multiple DC busses, according to an example embodiment.
Figure 5B:
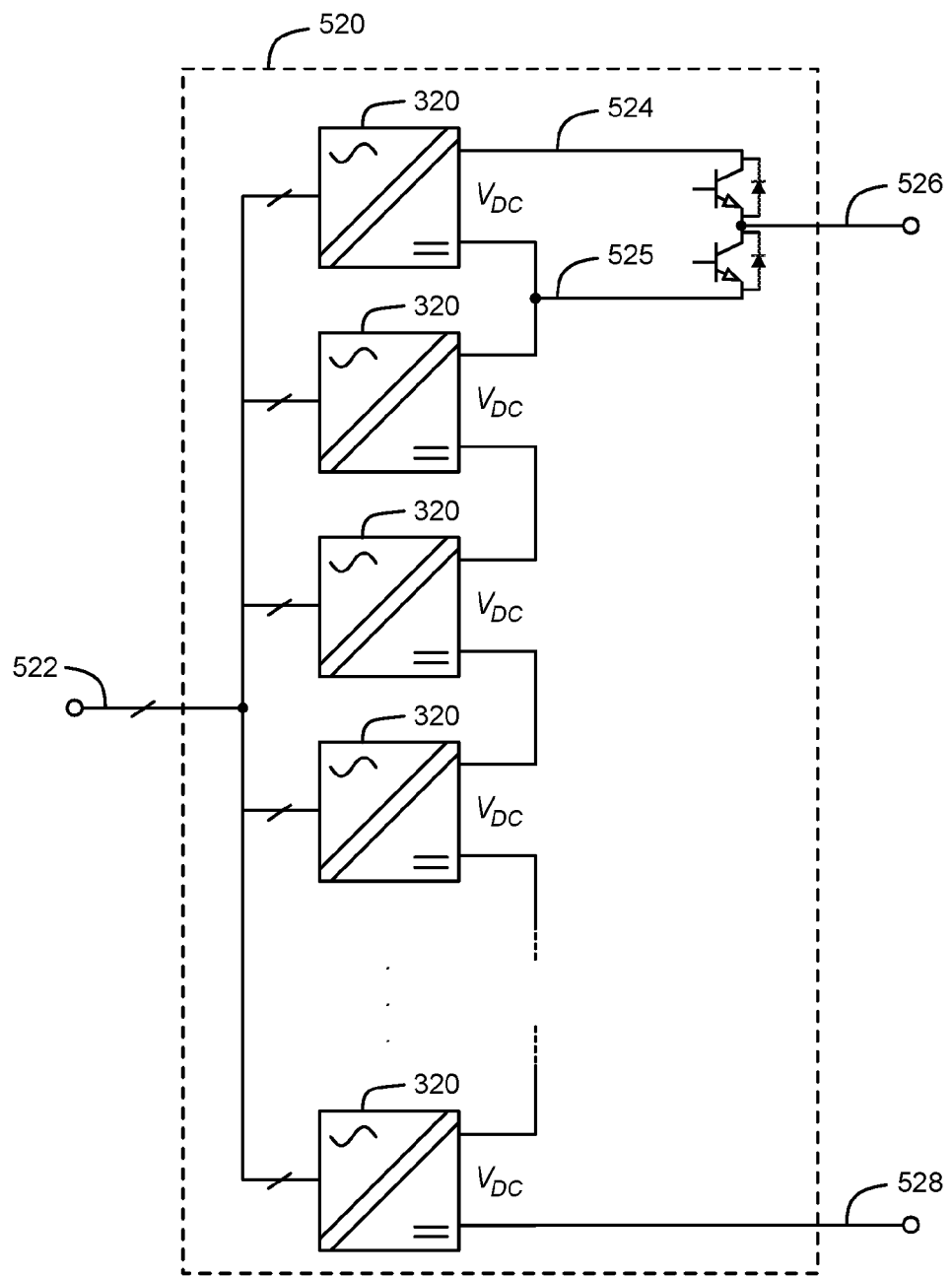
FIG. 5B is a schematic diagram of a bidirectional power converter stack with a switched voltage bus, according to an example embodiment.

The bidirectional power converter stack 420 may be a combination of bidirectional power converters with series-connected DC terminals that form the converter stack. Some example bidirectional power converter stacks are illustrated in FIGS. 5A and 5B. The bidirectional power converter stack 420 may be similar to bidirectional power converter 330, and may also include multiple voltage output capabilities.

In some instances, the bidirectional power converter stack 420 may output a single voltage bus, which may comprise two conductive lines. In some implementations, one conductive line carries a positive voltage, while the other conductive line is grounded. In other implementations, one conductive line carries a positive voltage (with respect to ground), while the other conductive line carries a negative voltage (with respect to ground). In additional implementations, one conductive line carries a negative voltage, while the other conductive line is grounded.

In some embodiments, the bidirectional power converter stack 420 may output multiple voltages with respect to ground or the negative rail. For example, the bidirectional power converter stack 420 might include a "nominal" bus and a "fault" bus, which carry different voltages with respect to ground or the negative rail. Other implementations may include any number of busses of various voltage levels. Thus, as illustrated in FIG. 4, DC-side output of the bidirectional power converter stack 420 may carry multiple conductive lines, each of which might be driven at a different voltage level.

The ground stations 430, 432, and 434 may be hardware stations that can serve as a mechanical anchor on the ground to a respective AWT via a respective tether 440, 442, and 444. The ground stations 430, 432, and 434 may include electronic devices, such as power electronics and controllers, as well as mechanical devices, such as actuators and winches. Additionally, the ground stations 430, 432, and 434 may be incorporated within a vehicle—such as a car or a truck—to allow the ground stations to be mobile and easily positioned.

The ground stations 430, 432, and 434 may include electronics and switching devices for performing voltage conversion and/or selection. In some embodiments, the ground stations 430, 432, and 434 may interface with two or more voltage busses from the bidirectional power converter stack 420; in these embodiments, the ground stations 430, 432, and 434 could include switching devices that selectively energizes respective tethers 440, 442, and 444 with one particular voltage bus. In other embodiments, the ground stations 430, 432, and 434 may perform their own voltage conversion (e.g., DC-DC conversion) on DC power from the bidirectional power converter stack 420, which may be carried out by any combination of power electronics (e.g., transformers, autotransformers, switched DC-DC voltage converters, buck-boost converters, voltage regulators, etc.); in these embodiments, the ground stations 430, 432, and 434 could include switching devices to selectively energize respective tethers 440, 442, and 444 with either the voltage bus of the bidirectional power converter stack 420 or the output of a voltage converter within the ground station.

The tethers 440, 442, 444 may act as mechanical links and as power conductors to a device carrying their respective DC motor-generators 450, 452, 454. The tethers 440, 442, 444 may be attached to an actuator or winch that can extend the effective length of the tethers 440, 442, 444 (e.g., at the start of operation of the AWTs prior to beginning power generation) and/or "reel" the tethers (e.g., at the conclusion of operation of the AWTs to finish power generation).

The tethers 440, 442, 444 may also include a conductive line or lines that transmits information between the ground stations and their respective DC motor-generators. For instance, the tethers 440, 442, 444 might carry a data line that transmits information about the occurrence of a fault on a DC motor-generator, which is sent to the respective ground station. The ground stations 430, 432, 434 may include a controller or computing device that can receive the fault information from the DC motor-generators and responsively alter the voltage delivered to the DC motor-generators via the tether. Note that the "information" may be raw sensor outputs (e.g., analog voltage measurements) that the ground station can receive and responsively take actions based on that information.

A DC motor-generator may be determined as "faulted" based on voltage measurements across the DC motor-generator's electrical terminals, based on the rotational velocity of the DC motor-generator, based on an amount of power consumed by the DC motor-generator, an amount of heat generated by a DC motor-generator, or some combination thereof, or other examples. For example, if the DC motor-generator is spinning at a rotational velocity that is lower than a threshold rotational velocity (relative to other motor-generators, based on an expected rotational velocity from wind measurements, etc.), a fault may be inferred from the diminished rotational velocity. If the DC motor-generator is producing excess heat, that may also be indicative of a fault. It should be understood that detecting a fault may involve various combinations of measurements, which could be observed separately or combined to determine whether or not a fault has occurred.

The DC motor-generators 450, 452, 454 may be similar to the DC motor-generators 350. There may be varied numbers of DC motor-generators that collectively form the DC motor-generators 450, 452, 454, arranged in varied combinations of series and/or parallel connections, depending on the particular implementation. The DC motor-generators 450, 452, 454 may include sensors, electronics, and/or computing devices that monitor the health of various components on the DC motor-generators and AWTs, both mechanical and electrical; such devices might transmit an indication of a fault and possibly other information along the tether to the ground station.

It should be understood that other multi-AWT power generation systems may include varied numbers of ground stations, tethers, DC motor-generators, and/or additional components or devices. For instance, some ground stations may be coupled to more than one AWT or set of motor-generators. As another example, multiple tethers may be coupled to a single AWT or set of motor-generators. The configuration depicted in FIG. 4 is provided for explanatory purposes, and the scope of the present application is not limited to the particular configuration of power distribution system 400.

V. EXAMPLE MULTI-BUS CONVERTER STACK CONFIGURATIONS

A. Multiple Busses

FIG. 5A is a schematic diagram of a bidirectional power converter stack 510 with multiple DC busses, according to an example embodiment. The bidirectional power converter stack 510 may be similar to the bidirectional power converter stack 330 illustrated in FIG. 3C; however, the bidirectional power converter stack 510 provides, in addition to the DC bus defined by conductive lines 514 and 516, another conductive line 518 tied to a node within the bidirectional power converter stack 510.

The voltage potential across conductive lines 514 and 516 may represent the full voltage potential of the bidirectional power converter stack 510. For explanatory purposes, conductive line 516 may be referred to as the "ground" line (or, in some implementations, the negative bus line). In some implementations, conductive line 516 may be grounded; however, other implementations may tie a different node (e.g., some node within the converter stack) to ground, which would cause the conductive line 516 to carry a negative voltage with respect to ground. Regardless of the implementation, the conductive line 514 may be referred to herein as the "nominal" bus, carrying the full voltage potential of the bidirectional power converter stack 510 with respect to conductive line 516.

The voltage potential across conductive lines 518 and 516 may represent a reduced voltage potential of the bidirectional power converter stack 510. The conductive line 518 may be referred to herein as a "fault" bus, carrying a reduced voltage potential of the bidirectional power converter stack 510. The fault bus 518 may operate at a lower voltage compared to the nominal bus 514. Both the nominal bus and the fault bus may be provided to a respective base station, making both voltages available for energizing the tether and driving the DC motor-generators.

As one specific example, consider a stack of eight bidirectional power converters, each configured to output 400 V during nominal operation. In this example, the nominal bus would carry 3200 V (the sum of the eight 400 V bidirectional power converter DC outputs), while the fault bus would carry 2800 V (the sum of seven of the eight 400 V bidirectional power converter converter DC outputs).

During normal operation, an AWT's DC motor-generators may be driven by the nominal voltage bus. However, if one of the motor-generators shorts and no longer causes a significant voltage drop, then the remaining operating motor-generators are at risk of overvolting. In this scenario, a controller within the base station might switch from energizing the tether with the nominal bus to energizing the tether with the fault bus, which is a lower voltage.

Note that, although a single nominal bus and a single fault bus are illustrated in FIG. 5A, other implementations may utilize three or more busses, each potentially carrying a different voltage level. Additionally, the "nominal" bus may not utilize the entire converter stack; in other words, a fault bus might carry a higher voltage, which may be utilized if the nominal bus would otherwise undervolt the DC motor-generators (which could potentially be insufficient to drive the DC motor-generators).

B. Single Tunable Bus

FIG. 5B is a schematic diagram of a bidirectional power converter stack 520 with a switched voltage bus, according to an example embodiment. The bidirectional power converter stack 520 may be similar to the bidirectional power converter stack 510 in FIG. 5B; however, the output of the bidirectional power converter stack 520 does not have a separate "fault" bus. Here, the conductive line 526 is coupled to a switching bridge that enables the conductive line 526 to be selectively energized by either conductive line 524 or conductive line 525. The conductive line 524 may be similar to the nominal bus of FIG. 5A, and the conductive line 525 may be similar to the fault bus of FIG. 5B. Accordingly, the conductive line 526 may be powered by either of the two conductive lines 524, 525. The switching bridge may also be referred to as a power station and may be part of the bidirectional power converter stack 520 as shown, or may be considered a separate component. A power station may include more than the switch bridge shown in FIG. 5B; for example, a power station may include a controller configured to determine that a fault occurred based on a voltage measurement at the aerial vehicle During normal operation, an AWT's DC motor-generators may be driven by the bidirectional power converter stack 520 DC voltage output driven by conductive line 524 (i.e., the nominal bus). However, if one of the motor-generators shorts and no longer results in a substantial voltage drop across the motor-generator, then the remaining operating motor-generators are at risk of overvolting. In this scenario, a controller within the bidirectional power converter 520 might cause the switching bridge to energize the DC voltage bus 526 with the conductive line 525 (i.e., the fault bus). Thus, external to the stack, the DC bus 526 of the bidirectional power converter stack can output varying voltage levels.

Note that, although the conductive lines 524, 525 are illustrated to selectively conduct through to DC bus 526, other nodes within the bidirectional power converter stack 520 may also selectively conduct onto the DC bus 526.

VI. EXAMPLE BASE STATION VOLTAGE CONVERSION CONFIGURATIONS

A. Example Configuration

Figure 6A:
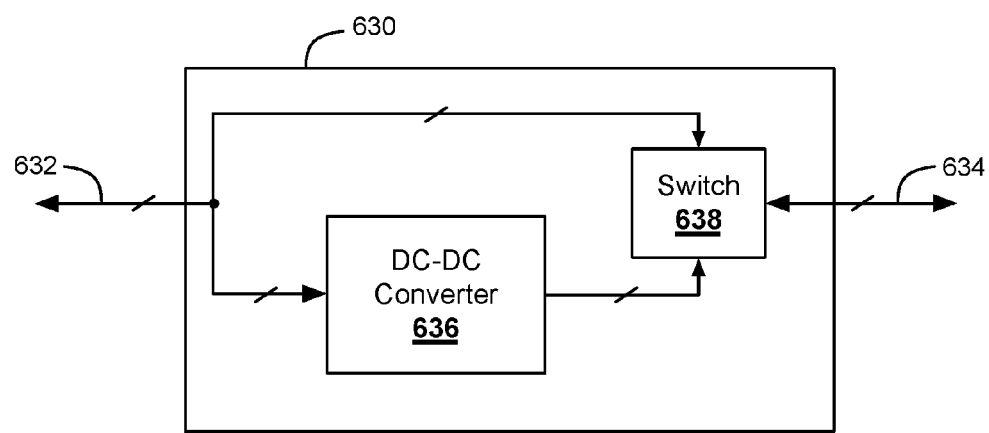
FIG. 6A is a simplified block diagram of a base station, according to an example embodiment.

FIG. 6A is a simplified block diagram of a base station 630, according to an example embodiment. The base station 630 includes a stack interface 632 and tether interface 634. The stack interface 632 may receive power from and provide power to a bidirectional power converter stack's DC bus. The tether interface 634 may provide power to and receive power from a tether coupled to DC motor-generators. The base station 630 also includes a DC-DC converter 636 and a switch 638. A ground power unit may include a stack interface, a tether interface, a DC-DC converter, and/or a switch as depicted, for example in FIG. 6A.

When power flows from the stack interface 632 to the tether interface 634, the tether interface 634 may be selectively energized by either a conductive line from the stack's DC bus, or from a conductive line from the DC-DC converter 636. Switch 638 may facilitate the selective energizing of the tether interface 634. The stack's DC bus (which is received at the stack interface 632) may include one or more conductive lines (e.g., a nominal bus, a fault bus, etc.), each of which may carry a different voltage. Additionally, the DC-DC converter 636 may output one or more different voltage levels. The switch 638 may comprise multiple switching devices that can select one conductive line—from either the stack interface 632 or the DC-DC converter 636—to energize the tether interface 634.

During normal operation, the switch may conduct from a nominal DC bus to the tether interface 634. However, upon the occurrence of a motor-generator fault, the switch 638 may conduct from a fault bus from the stack interface 632, or from a conductive line output by the DC-DC converter 636. Regardless of the voltage conversion technique (at the bidirectional power converter stack, the base station, or otherwise), the tether interface 634 may be energized by a different voltage when a fault occurs, which may be a reduced voltage or is otherwise changed to mitigate the fault.

Figure 6B:
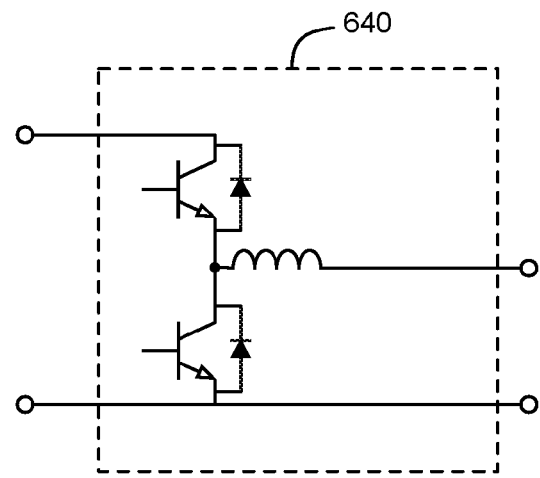
FIG. 6B is a schematic diagram of a fully rated converter, according to an example embodiment.
Figure 6C:
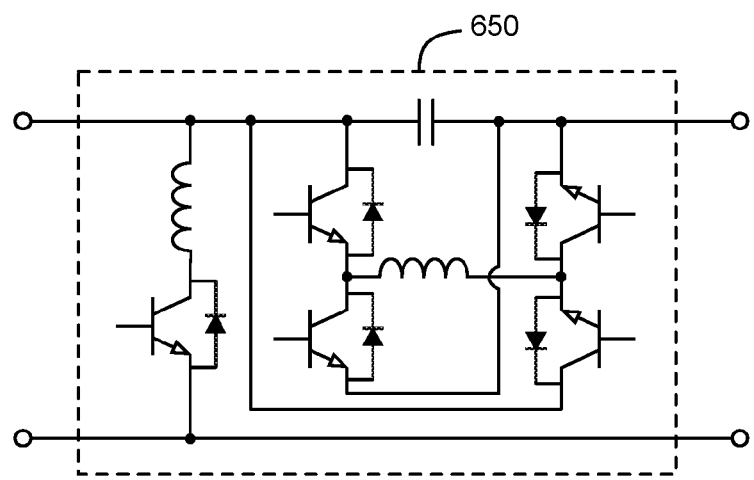
FIG. 6C is a schematic diagram of a partially rated converter, according to an example embodiment.

The DC-DC converter 636 may be implemented in a variety of ways. In some embodiments, the DC-DC converter 636 may be a fully rated converter 640, as illustrated in FIG. 6B. In other embodiments, the DC-DC converter 636 may be a partially rated converter 650, as illustrated in FIG. 6C. The DC-DC converter 636 may also be implemented using other power electronic configurations that convert between power and/or voltage levels.

VII. CONCLUSION

It should be understood that arrangements described herein are for purposes of example only. As such, those skilled in the art will appreciate that other arrangements and other elements (e.g. machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. It is also to be understood that the terminology used herein is for the purpose of describing particular implementations only, and is not intended to be limiting.

What is claimed is:

1. A power distribution system comprising:
a ground power unit configured to convert an input AC power into DC power output, wherein the ground power unit includes at least a first bus, second bus, and a third bus, wherein the first bus is configured to operate at a first voltage level referenced to the third bus, and wherein the second bus is configured to operate at a second voltage level referenced to the third bus that is different from the first voltage level;
an aerial vehicle including a plurality of motor-generators coupled to a respective plurality of turbines, wherein the plurality of motor-generators is configured to be energized by power received from a tether; and
a power station electrically coupled to at least the first bus, the second bus, and the tether, wherein the power station is configured to:
selectively energize the tether using the first bus; and
responsive to detecting a fault by at least one motor-generator of the plurality of motor-generators, selectively energize the tether using the second bus and not the first bus.

2. The power distribution system of claim 1, wherein the ground power unit is a converter stack comprising a plurality of power converters having DC terminals that are coupled to each other in series.

3. The power distribution system of claim 2, wherein the first bus is electrically coupled to a first DC terminal of a first power converter of the plurality of power converters, wherein the second bus is electrically coupled to a second DC terminal of a second power converter of the plurality of power converters, and wherein the third bus is electrically coupled to a third DC terminal of a power converter that is not the first power converter of the plurality of power converters.

4. The power distribution system of claim 1, wherein the power station comprises a switching device that carries out the selective energizing of the tether.

5. The power distribution system of claim 4, wherein the switching device includes at least one transistor.

6. The power distribution system of claim 1, wherein the ground power unit further includes a voltage converter configured to generate the second voltage level based on an input from the first bus at the first voltage level.

7. The power distribution system of claim 1, wherein the power station comprises a controller configured to determine that a fault occurred based on a voltage measurement at the aerial vehicle.

8. A power distribution system comprising:
a ground power unit configured to convert an input AC power into DC power, wherein the ground power unit includes a first bus configured to operate at a first voltage level to a reference bus;
an aerial vehicle including a plurality of motor-generators coupled to a respective plurality of turbines, wherein the plurality of motor-generators is configured to be energized by power received from a tether; and
a power station electrically coupled to the first bus and the tether, wherein the power station includes a power converter that receives power from the first bus and is configured to output a second voltage level to a reference bus via a second bus, and wherein the power station is configured to selectively energize the tether using either the first bus or the second bus responsive to detecting a fault by at least one motor-generator of the plurality of motor-generators.

9. The power distribution system of claim 8, wherein the power converter is a partially rated power converter.

10. The power distribution system of claim 8, wherein the power converter is a fully rated power converter.

11. The power distribution system of claim 8, wherein the ground power unit is a converter stack comprising a plurality of power converters having DC terminals that are coupled to each other in series.

12. The power distribution system of claim 8, wherein the power station comprises a switching device that carries out the selective energizing of the tether.

13. The power distribution system of claim 12, wherein the switching device includes at least one transistor.

14. A method comprising:
providing a first power bus configured to operate at a first DC reference voltage by converting AC power from an AC source into DC power;
providing a second power bus configured to operate at a second DC reference voltage that is different from the first DC reference voltage;
energizing a plurality of motor-generators from the first power bus;
determining an operational condition of the plurality of motor-generators; and
based on the determined operational condition being indicative of a fault, energizing the plurality of motor-generators from the second power bus.

15. The method of claim 14, wherein providing the second power bus comprises converting AC power from the AC source into DC power having the second DC reference voltage.

16. The method of claim 14, wherein providing the second power bus comprises converting DC power having the first DC reference voltage from the first power bus into DC power having the second DC reference voltage.

17. The method of claim 14, wherein determining the operational condition of a particular motor-generator of the plurality of motor-generators comprises determining a DC voltage level across the motor-generator, wherein the operational condition is indicative of a fault when the DC voltage level is below a threshold voltage level.

18. The method of claim 14, wherein determining the operational condition of a particular motor-generator of the plurality of motor-generators comprises determining a rotational velocity of the motor-generator, wherein the operational condition is indicative of a fault when the rotational velocity is below a threshold rotational velocity.

19. The method of claim 14, wherein determining the operational condition of a particular motor-generator of the plurality of motor-generators comprises determining a temperature of the motor-generator, wherein the operational condition is indicative of a fault when the temperature of the motor-generator exceeds a threshold temperature.

20. The method of claim 14, wherein energizing the plurality of motor-generators from the second power bus comprises causing a switching device to switch from a first mode to a second mode, wherein the first mode energizes the plurality of motor-generators using the first power bus, and wherein the second mode energizes the plurality of motor-generators using the second power bus.

\* \* \* \* \*